United States Patent [19]

Toda et al.

[11] 4,243,196
[45] Jan. 6, 1981

[54] CONSTRUCTION FOR MOUNTING INSIDE REAR VIEW MIRROR IN MOTOR VEHICLE

[75] Inventors: Tadayoshi Toda; Kazuaki Omote, both of Yokohama; Mamoru Imai, Fujisawa, all of Japan

[73] Assignee: Nissan Motor Company, Limited, Yokohama, Japan

[21] Appl. No.: 23,651

[22] Filed: Mar. 26, 1979

[30] Foreign Application Priority Data

Apr. 14, 1978 [JP] Japan .............................. 53-49562[U]

[51] Int. Cl.³ .............................................. A47F 7/14
[52] U.S. Cl. .................................. 248/475 R; 296/210
[58] Field of Search ............... 248/549, 475 R, 475 B; 296/28 R, 37.7, 137 A

[56] References Cited

U.S. PATENT DOCUMENTS

| 2,143,943 | 1/1939 | Haberstump | 296/137 A |
| 2,207,958 | 7/1940 | Tuell | 296/137 A |
| 3,379,469 | 4/1968 | Elia | 296/137 A |
| 3,425,657 | 2/1969 | Doyle | 248/475 B |
| 4,043,589 | 8/1977 | Alfter | 296/137 A |
| 4,073,535 | 2/1978 | Alfter | 296/137 A |

FOREIGN PATENT DOCUMENTS 1555223  8/1970  Fed. Rep. of Germany ...... 296/137 A

*Primary Examiner*—J. Franklin Foss

[57] ABSTRACT

In a passenger compartment of a motor vehicle a roof rail has a raised portion formed with an attachment surface substantially flush with the inside surface of a ceiling member exposed to the passenger compartment. A mirror mounting bracket is attached to the raised portion of the roof rail at the attachment surface of the latter. A circumferential space formed between the roof rail and the bracket is not visible because of the ceiling member sandwiched between the roof rail and the bracket.

3 Claims, 5 Drawing Figures

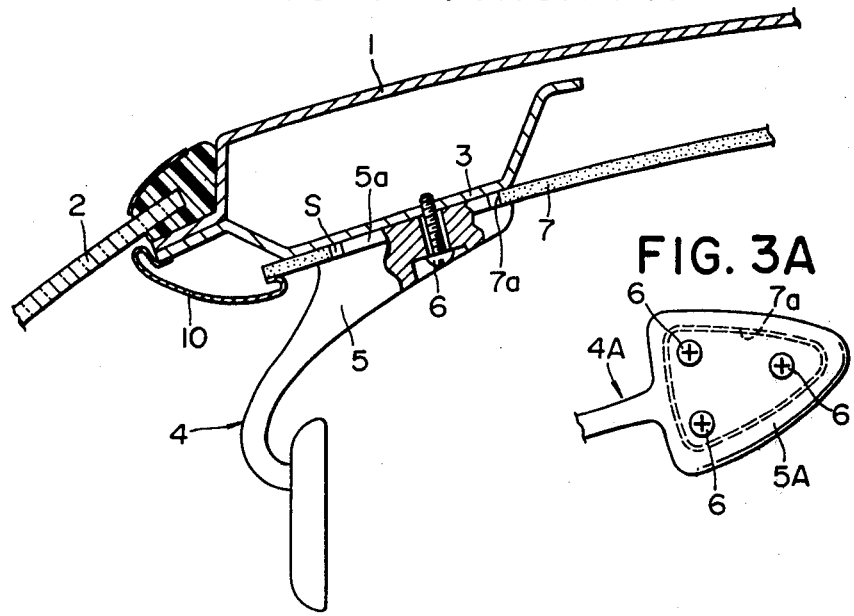
FIG. 1 PRIOR ART
FIG. 3A
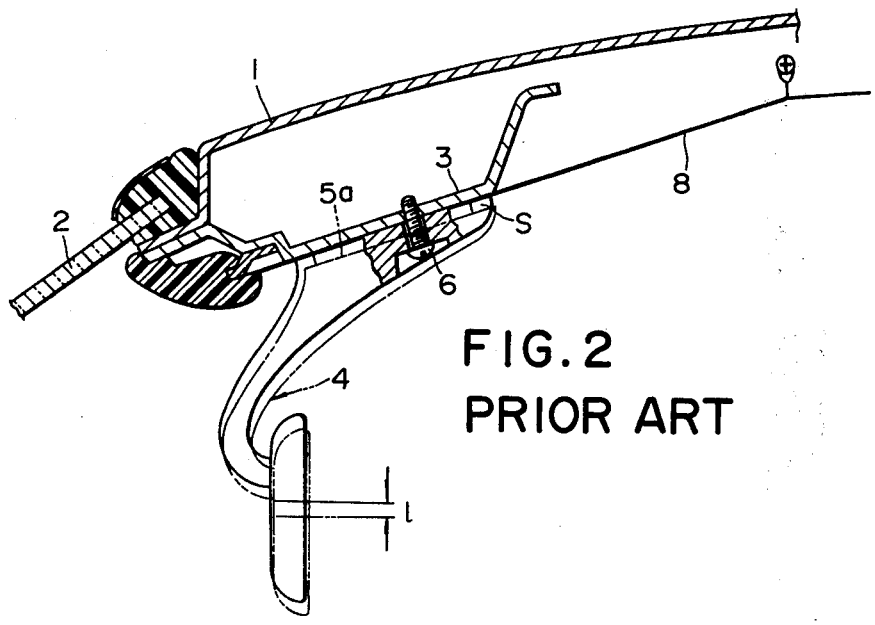
FIG. 2 PRIOR ART

CONSTRUCTION FOR MOUNTING INSIDE REAR VIEW MIRROR IN MOTOR VEHICLE

BACKGROUND OF THE INVENTION

The present invention relates to a motor vehicle, and more particularly to a construction for mounting an inside rear view mirror in a motor vehicle.

SUMMARY OF THE INVENTION

An object of the present invention is to provide a construction for mounting an inside rear view mirror which allows the use of the same kind of rear view mounting brackets both in motor vehicles employing a ceiling member with a substantial thickness and in different motor vehicles using a very thin ceiling member.

According to the present invention a roof rail is formed with a raised portion having an attachment surface, a mirror mounting bracket is attached at a mating surface thereof to the attachment surface of the roof rail to form a circumferential space around the raised portion, and a ceiling member is sandwiched between the roof rail and the bracket. With this construction, the space provided between the roof rail and the bracket can be concealed from view.

BRIEF DESCRIPTION OF THE DRAWINGS

In the accompanying drawings:

FIG. 1 is a partial sectional view of an automobile employing a ceiling member with a substantial thickness, showing a conventional construction for mounting an inside rear view mirror;

FIG. 2 is a similar view of an automobile of the same type as that in FIG. 1 but employing a very thin ceiling member in which the same conventional construction as applied in FIG. 1 is applied;

FIG. 3A is a fragmentary plan view as viewed along an arrow A in FIG. 3; and

DETAILED DESCRIPTION OF THE DRAWINGS

Figure 3:
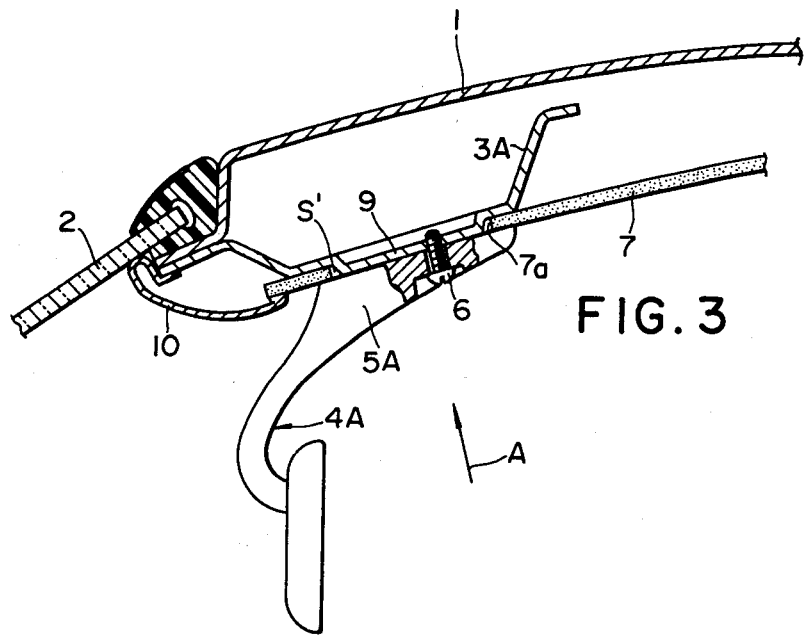
FIG. 3 is a partial sectional view of an automobile employing a ceiling member with a substantial thickness, showing a construction for mounting an inside rear view mirror according to the present invention.

Before entering into the description of the preferred embodiment according to the present invention, description will be made hereinlater as to the conventional construction for mounting an inside rear view mirror in connection with FIGS. 1 and 2.

In FIG. 1 a roof panel 1 and a front glass 2 are shown in which a roof rail 3 is secured to the roof panel and a rear view mirror or a rear view mirror mounting bracket 4 is attached to the roof rail and extending into a passenger compartment.

The bracket 4 includes a body portion 5 formed with a raised portion 5a having a surface mating to an attachment surface of the roof rail. The bracket 4 also includes a leg portion extending downwardly from the body portion and carrying a rear view mirror.

With three screws 6, the bracket 4 is attached securely to the roof rail 3 at the attachment surface of the latter. As the mating surface is formed on the raised portion 5a of the bracket 4, a circumferential space S is formed between the bracket 4 and the roof rail 3 around the raised portion 5a.

The raised portion 5a is disposed within an aperture 7a formed through a ceiling member 7 with a substantial thickness, such as a corrugated cardboard. The ceiling member 7, as shown in FIG. 1, is sandwiched between the roof rail 3 and the bracket 4 and received by the circumferential space. So that the circumferential space S around the raised portion 5a is not visible.

The height of the raised portion 5a is such that the ceiling member of the corrugated cardboard 7 may not be broken by being compressed between the roof rail 3 and the bracket 4.

A problem will arise in this construction if a very thin ceiling member such as a fabric 8 is employed as sandwitched between the roof rail 3 and the raised portion 5a of the bracket 4, shown in phantom, of the same design and construction as used in FIG. 1. The problem is that the circumferential space around the raised portion is visible.

If the raised portion 5a is removed to permit direct contact of the flat surface from which the portion 5a is raised, with the attachment surface of the roof rail 3, the location of the rear view mirror will be raised by an amount l resulting from the removal of the raised portion. This may be inconvenient practically, however.

Therefore, it has been necessary to manufacture two different kinds of mirror mounting brackets, one for use in the automobiles as shown in FIG. 1, the other for use in the automobiles as shown in FIG. 2, thus adding to the number of component parts to be managed in an assembly line. As a result, the management of the component parts becomes complicated and the work in the assembly line becomes complicated, too.

The preferred embodiment according to the present invention will now be described in connection with FIGS. 3 and 3A.

Referring to FIG. 3, the same reference numerals as used in FIG. 1 are used to designate similar parts. A roof rail 3A, secured to a roof panel 1, has a raised portion or emboss 9 projecting toward a passenger compartment. The raised portion 9 is formed with a flat attachment surface substantially flush with the inside surface of a ceiling member 7 of corrugated cardboard so as to prevent the corrugated cardboard from being damaged. The raised portion 9 is disposed within an aperture 7b formed through the ceiling member 7 and the height of the raised portion 9 is substantially equal to the thickness of the ceiling member 7. The raised portion 9 is formed by pressing.

As shown in FIG. 3A, a rear view mirror mounting bracket 4A includes a body portion 5A formed with a flat surface having a generally triangular shape. This flat surface is in contact with the attachment surface of the raised portion 9 when the bracket 4A is securely attached to the raised portion 9 by means of three screws.

It will be noted from FIG. 3 that a circumferential space S′ is formed between the roof rail 3A and the body portion 5A of the bracket 4A and around the raised portion 9. The ceiling member 7 is sandwiched between the roof rail 3A and the bracket 4A with a portion around the aperture 7a inserting into the circumferential space S′. Since this space S′ receive the portion of the ceiling member 7 around the aperture 7a, it is not visible.

Figure 4:
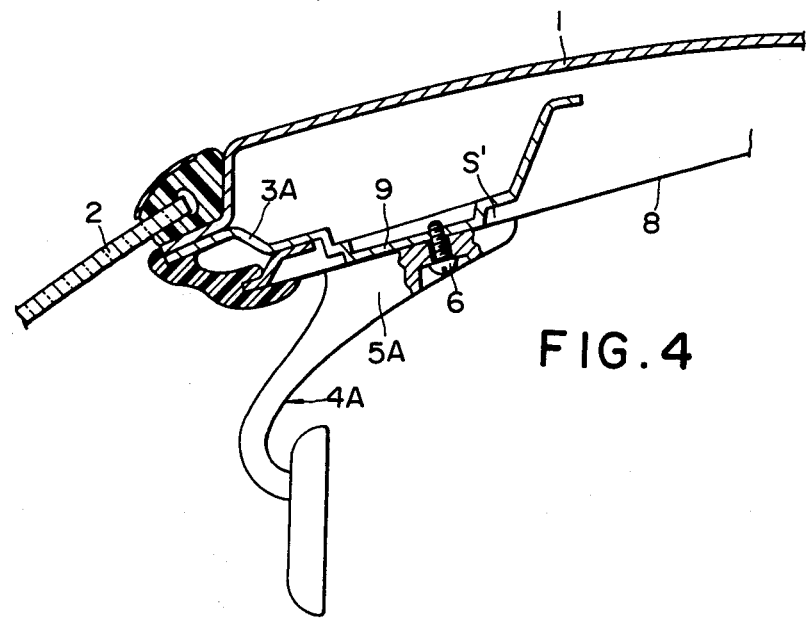
FIG. 4 is a similar view of an automobile of the same type as that in FIG. 3 but employing a very thin ceiling member in which substantially the same construction as applied in FIG. 3 is applied.

In the case of FIG. 4, a very thin ceiling member 8 is employed instead of the relatively thick ceiling member 7. As will be readily understood from this Figure, the ceiling member 8 is sandwitched between the attachment surface on the raised portion 9 and the mating surface on the body portion 5A and the circumferential space S' is concealed by the ceiling member 8.

It will be appreciated from the foregoing description in connection with FIGS. 3 to 4 that since the interface at which the bracket 4A is attached to the roof rail 3A is fixed and the circumferential space S' is concealed by the ceiling member 7 or 8.

What is claimed is:

1. In a vehicle having a passenger compartment, a first relatively thick ceiling member for the ceiling of said passenger compartment, said first ceiling member being formed with an aperture;

a roof rail having a raised portion with an attachment surface, said raised portion being received in said aperture so that said attachment surface is substantially flush with the inner surface of said first ceiling member;

a mirror mounting bracket having a flat surface attached to said attachment surface, said flat surface being greater in area than said aperture so that said roof rail and said flat surface define a concealed circumferential space around said raised portion, the arrangement of the foregoing being such that said first ceiling member can be replaced with a second thinner one which is sandwiched between said roof rail and said bracket thus retaining said circumferential space concealed.

2. In a vehicle having a passenger compartment a roof rail;

a mirror mounting bracket connected to said roof rail via fastening means; and a ceiling member interposed between said roof rail and said bracket; the improvement comprising:

said roof rail being provided with a raised portion having a predetermined height, and said bracket having a flat surface which seats on said raised portion and which has an area greater than said raised portion whereby with the same roof rail and bracket it is possible to interchange a relatively rigid ceiling member having a thickness substantially equal to the height of said raised portion and which is formed with an aperture for receiving said raised portion smaller in area than said flat surface with a ceiling member which is relatively thin and flexible which is sandwiched between said raised portion and said flat surface and through which said fastening means only passes, without an unsightly gap being formed between either of said ceiling members and said flat surface.

3. In a vehicle having a passenger compartment and a roof rail disposed on the roof of said vehicle a method of mounting a mirror mounting bracket to said roof rail so that with the same bracket and roof rail, a relatively thick and rigid ceiling member and a relatively thin flexible ceiling member can be used in said vehicle without the appearance of an unsightly gap between said ceiling member and said bracket, said roof rail being formed with a raised portion having a height substantially equal to the thickness of said thick and rigid ceiling member, said bracket having a flat surface which seats on said raised portion and said thick and rigid ceiling member having an aperture which is larger in area than said raised portion and smaller than said flat surface, comprising the steps of:

mounting said bracket to said roof rail with said thick and rigid ceiling member by disposing said raised portion in said aperture, seating said bracket on said raised portion so that said flat surface contacts and holds said thick and rigid ceiling member against said roof rail and encloses a peripheral space defined around said raised portion, and fastening said bracket to said roof rail via fastening means; and mounting said bracket to said roof rail with said thin and flexible ceiling member by overlaying said thin and flexible ceiling member on said raised portion thus concealing said raised portion, seating said bracket on said thin and flexible ceiling member thus sandwiching said thin and flexible ceiling member between said flat surface and said raised portion, and inserting said fastening means through said thin and flexible ceiling member for retaining said bracket on said roof rail.

* * * * *